Feb. 23, 1943.    L. McLEAN    2,311,954
APPARATUS FOR PNEUMATICALLY RECOVERING METALS
Filed May 6, 1939    2 Sheets-Sheet 1
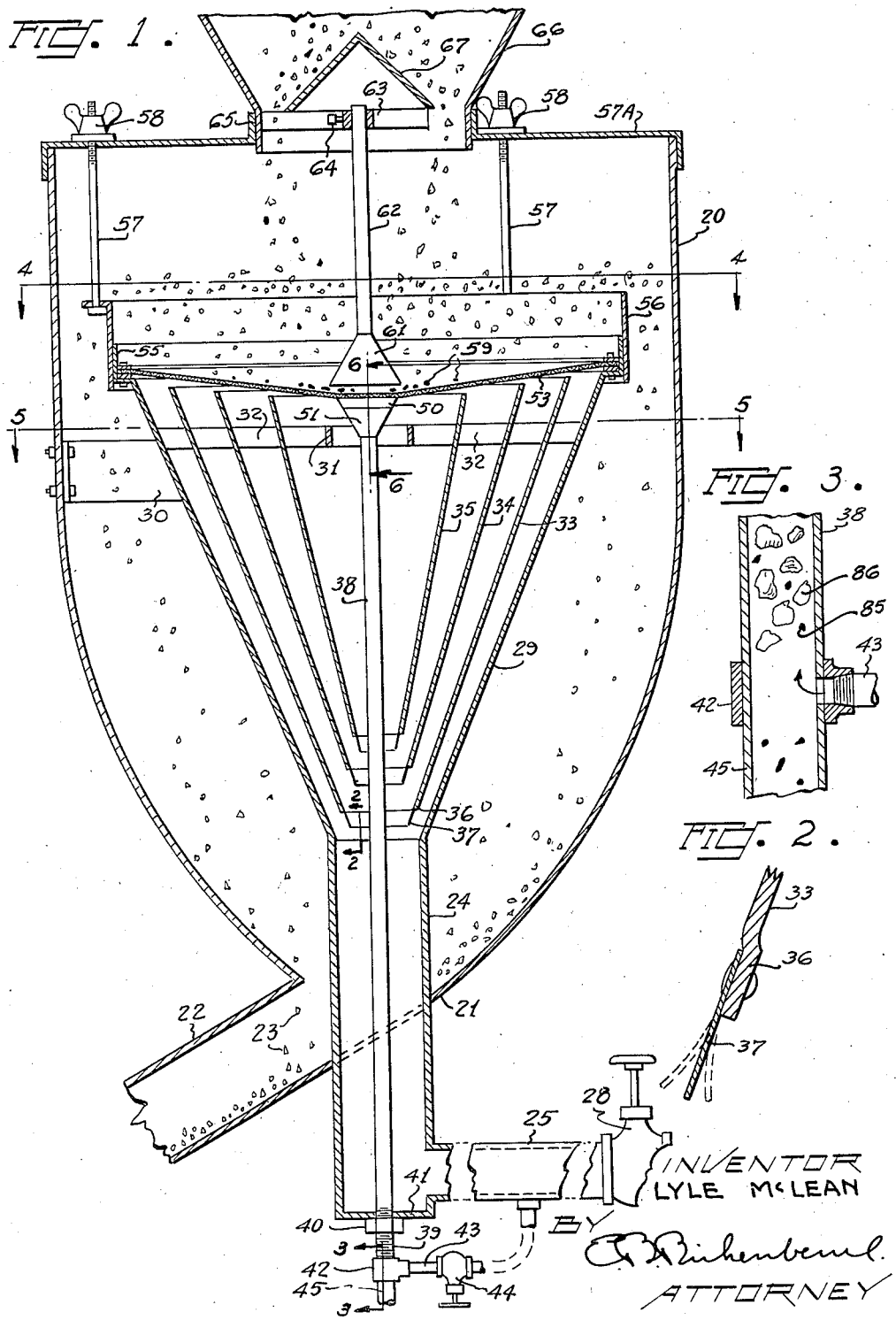

Feb. 23, 1943. L. McLEAN 2,311,954
APPARATUS FOR PNEUMATICALLY RECOVERING METALS
Filed May 6, 1939 2 Sheets-Sheet 2

INVENTOR
LYLE McLEAN
BY
ATTORNEY

Patented Feb. 23, 1943

2,311,954

UNITED STATES PATENT OFFICE 2,311,954

APPARATUS FOR PNEUMATICALLY RECOVERING METALS

Lyle McLean, Portland, Oreg.

Application May 6, 1939, Serial No. 272,285

2 Claims. (Cl. 209—474)

This invention relates generally to the art of mining, and particularly to an apparatus for pneumatically recovering metals.

The main object of this invention is to construct an apparatus for pneumatically recovering metals from gangue by what is known as a "dry" process.

The second object is to effect such recovery as completely and rapidly as possible.

The third object is to develop a classification process whereby relatively large volumes of material may be handled in a continuous process without subjecting the recovered metals to wear and disintegration due to the abrasive, grinding and crushing action of the turbulent materials.

The fourth object is to utilize the great differences in the specific gravities of the metals and the gangue and the inversely greater volumes of the particles to assist in the pneumatic separation thereof by subjecting the material to an upward flow of air of sufficient volume and velocity to float the gangue but insufficient to float the metallic portions thereof.

The fifth object is to utilize the stream line characteristics of the nuggets and flakes to insure the heavier metal portions having their smaller cross-section presented to the action of the upwardly moving air.

The sixth object is to construct a special form of pneumatic concentrating table having a low point for the collection of metals and a bleeder for withdrawing the metals as rapidly as they collect at the low point of the table including a means for further concentrating the materials after they have been carried away from the table and further to provide a means for controlling the flow of air to the materials and then disposing of the waste materials.

I accomplish these and other objects in the manner set forth in the following specification as illustrated in the accompanying drawings, in which:

Fig. 1 is a typical vertical section taken through one of the recovery units.

Fig. 2 is an enlarged section of a cone tip taken along the line 2—2 in Fig. 1.

Fig. 3 is an enlarged fragmentary section taken along the line 3—3 in Fig. 1.

Similar numerals refer to similar parts throughout the several views.

Figure 4:
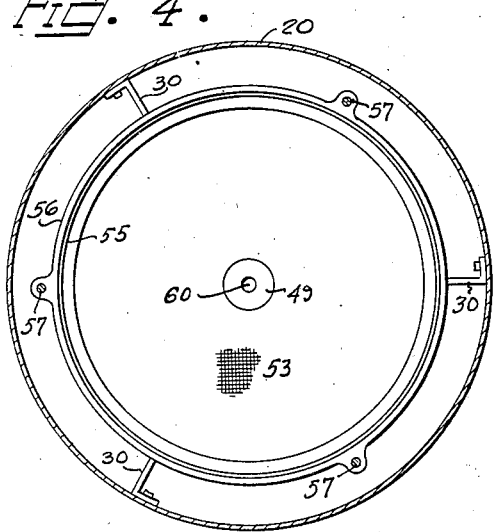
Fig. 4 is a horizontal section taken along the line 4—4 in Fig. 1.
Figure 5:
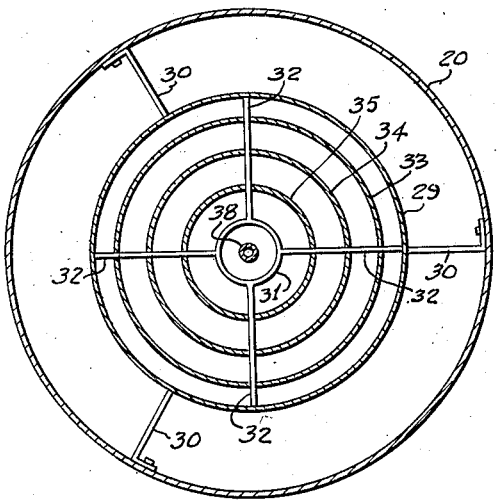
Fig. 5 is a horizontal section taken along the line 5—5 in Fig. 1.

Referring in detail to the drawings, there is shown a recovery unit consisting of a cylindrical shell 20 whose lower end converges at a rounded point 21 provided with a laterally extending outlet pipe 22 through which the waste materials 23 escape to the dump.

Extending axially through the point 21 is the vertical stand pipe 24 to whose lower end is connected the air supply pipe 25 to which air is supplied by a fan not shown. A valve 28 is provided in the pipe 25 and this valve may either be manually controlled or of the automatic type by means of which the volume and pressure may be governed within desired limits. Control mechanisms of this type are now in common use for various purposes and the details thereof will be omitted from this description.

On the upper end of the stand pipe 24 is disposed the inverted cone 29 which is attached to the shell 20 by means of the arms 30. Within the cone 29 is placed a spider consisting of a central ring 31 and the radial arms 32, the outer ends of which are secured to the cone 29. The arms 32 serve to support a plurality of smaller cones 33, 34 and 35, the lower ends of which are formed as shown in Fig. 2, that is, to the lower edge 36 of each of the cones 33 to 35 is secured a flexible lip 37 which is preferably made of soft copper and may be bent as shown in dotted lines in Fig. 2.

Extending axially through the stand pipe 24 and through the center of the cones 29, 33, 34, and 35 is the vertical bleeder pipe 38 whose lower end 39 is threaded and provided with a tightening nut 40 which bears against the bottom end 41 of the stand pipe 24. The T-fitting 42 is secured on the threaded end 39 and has its side outlet connected by means of a pipe 43 to the air supply pipe 25. The pipe 43 is provided with an air control valve 44. The lower outlet of the T-fitting 42 is connected by means of a pipe 45 to a gold collection box not shown.

On the threaded upper end of the bleeder pipe 38 is mounted the coupling 47 against whose flange 48 rests the collar 49 which occupies a seat within the ring 50 which in turn is held in position by means of the tapering collar 51 which is secured by the set screw 52. A screen 53 is held between the collar 49 and the ring 50 by means of the screws 54. The screen 53 is attached around its outer edge to the rim 55 which forms a part of the cone 29. Surrounding the rim 55 and slidable with relation thereto in a vertical direction is the vertical adjustable ring 56 which is held in a desired position by means of the rods 57 which in turn are suspended from the cover 57A by means of the nuts 58.

It will be seen that the screen 53 slopes toward the center of the bleeder pipe 38 causing the metal particles 59 to gravitate toward the center of the screen and descend through the opening 60 into the bleeder pipe 38.

Over the opening 60 is placed a block or inverted cone 61 which is provided with a shank 62 which passes through the bracket 63 in which it is held by the set screw 64.

The cover 57A is provided with a flanged central opening 65 into which extends the hopper 66. A conical spreader 67 is placed above the bracket 63 and serves to direct the material away from the center of the screen 53.

The operation of the device is as follows:

The fan delivers air through the stand pipe 24 to the various cones 29, 33, 34, and 35 from whence it passes upwardly through the screen 53 and through the descending material at a velocity which will cause the material to dance around on the screen 53, the lighter particles working their way upward and the heavier particles of metal working their way downward until they strike the screen 53 and then gradually work their way to the center from which they pass through the opening 60 into the bleeder pipe 38.

While the cone or block 61 is set to prevent the passage of too much material into the bleeder pipe 38, it follows that when large nuggets are present, there is apt to be a wedging action within the bleeder pipe 38 itself. For this reason air is supplied to the bleeder pipe 38 under the control of the valve 44 maintaining a constant agitation of particles within the pipe 38 permitting the heavier metallic portions 85 to descend while the lighter rock portions 86 are displaced upwardly.

While this is taking place, the materials other than the metals being recovered are moving upwardly and over the ring 56 from whence they pass through the outlet pipe 22 to the dump.

Attention is drawn to the fact that the materials are kept in a state of loose, swirling agitation in which gravity moves the gold downwardly to a point of collection and an air current moves the gangue upwardly to a point of rejection and in which the gold or other metal is removed from the abrasive action of the device as soon as possible in order to prevent the gold from being subjected to unnecessary wear. The movement of the gold and other metals being recovered, is accelerated in its downward course on the screen 53 to the opening 60, by the fact that much of the friction of such gold and metals on the screen 53, is overcome by the suspending action of the air passing upwardly through the screen 53.

While the materials are being subjected to the action of the upwardly travelling currents of air, they are constantly being dried and held in almost free suspension which accounts for the fact that the heavy metals soon find the lower levels, through the interstices between the particles of materials being treated, resulting from the agitation and churning produced in such materials by the upwardly moving air currents passing through them, where they are collected.

In the bleeder pipe 38 the particles are subjected to a swirling motion which further expedites the separation of the metals from the gangue.

Figure 7:
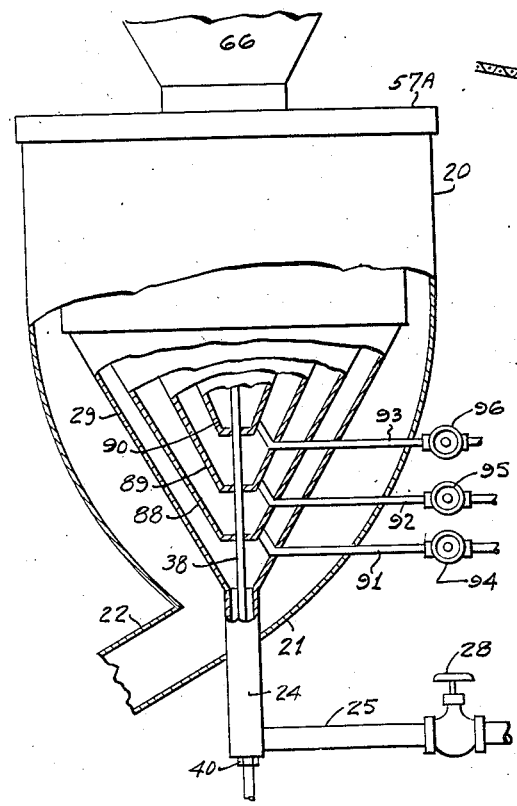
Fig. 7 is a broken section through a modified form of the recovery unit showing means for selectively controlling the flow of air to the various portions of the recovery screen.
Figure 6:
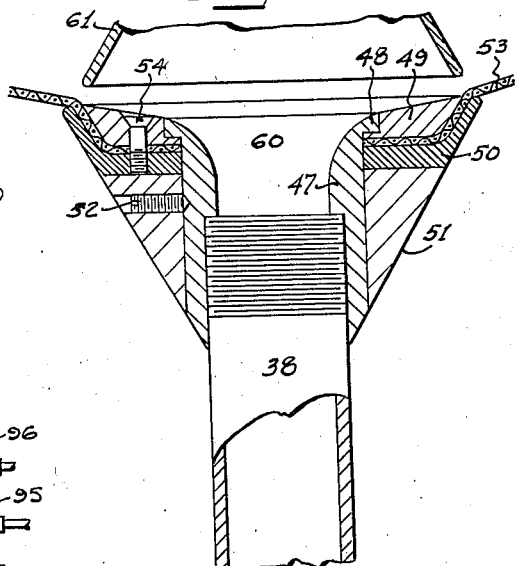
Fig. 6 is an enlarged fragmentary section through the bleeder inlet and a superimposed block.

In the form of the device shown in Fig. 7, the cones 88, 89, and 90 are sealed at their lower ends and provided with independent air supply pipes 91, 92, and 93 which are controlled by the separate valves 94, 95, and 96 in order that the supply of air delivered to the screen 53 may be accurately controlled over the entire surface of the screen, thus making it possible to provide for each annular area of such screen 53, the exact force or volume of air required, depending on the volume and weight of the materials on and above each of such areas of the screen. It will be understood that the remainder of the unit shown in Fig. 7 is identical with that shown in Fig. 1 and the parts have been correspondingly numbered.

By having the metals and concentrates continually "bleed" off from the recovery units, it eliminates the necessity for stopping the operations for "clean-ups," thereby very materially increasing the capacity of the apparatus.

The continuous discharge of the metals and concentrates as they are separated from the mass of the material treated, is one of the novel and important features of this method and apparatus.

It must be understood that the successful operation of this apparatus is dependent upon the formation of a "blanket" of the treated materials upon the screen 53 and that this "blanket" be of approximately uniform thickness in order that all of the materials may be subjected to the action of a uniform upwardly moving current of air which would not be possible if the layer of materials was not of a uniform thickness because the place where the material was the thinnest would permit the air to escape.

In other words, if the screen 53 is given a relatively steep pitch, the bed of materials would be thick at the center and thin at the edges, and the air would naturally follow the line of least resistance and escape around the rim of the screen leaving the material around the center dead.

While this method and apparatus have been described in connection with the recovery of gold and precious metals, it is obvious that they apply equally well for the separation and recovery of other objects of widely differing specific gravities.

It is essential that the material being treated be previously screened and classified in such manner that the weight of the largest component particles thereof shall be in such ratio to the weight of the smallest component particles of the metals or minerals contained therein as will enable the waste material to be so lifted and eliminated without removing the desired metal or mineral.

My invention contemplates a method and apparatus for the concentration and recovery of metal or ores which have been previously ground or pulverized to a point where the metal or metallic elements are freed from the gangue, and also of sand, gravel, clay eroded or decomposed materials and like substances, usually termed "placer deposits," and the separation and removal from such material by the application of air currents of a portion thereof, generally known as "concentrates," containing the metallic or mineral values present in the material treated, in such form as to permit the ready and speedy extraction of such values from said concentrates.

I claim:

1. In an apparatus of the class described, a recovery unit having a substantially horizontal screen sloping downwardly to form a low central point, said point having a central outlet formed therein, a bleeder pipe connected with the underside of said outlet adapted to hold collected gold, a cone mounted over said outlet having its point uppermost and having its larger end spaced vertically from the rim of the outlet for the purpose of limiting the size of objects passing downwardly through said opening, means for forcing air upwardly in a controlled manner across the entire area of said screen and means for forcing air upwardly through said bleeder pipe from the bottom thereof and outwardly from the bottom edge of said cone for the purpose of displacing the gangue therefrom in order to concentrate the gold within said pipe, and to break up the congestion of materials around the space below said cone.

2. An apparatus of the class described having in combination a substantially horizontal screen whose entire surface slopes downwardly from its outer edge to a central low point, said low point having a downwardly discharging outlet, an inverted cone adjustably placed over said outlet vertically spaced from said screen, a downturned bleeder pipe connected to said outlet adapted to hold collected gold, means for forcing air upwardly through said screen and means for forcing air upwardly through said bleeder pipe from its extreme lower end independently of the air passing through said screen and outwardly around the bottom of said cone.

LYLE McLEAN.